(12) United States Patent
Kreindl et al.

(10) Patent No.: US 9,786,198 B2
(45) Date of Patent: Oct. 10, 2017

(54) METHOD AND DEVICE FOR SIMULATING AN ELECTRODE WELDING PROCESS

(71) Applicant: Fronius International GmbH, Pettenbach (AT)

(72) Inventors: Josef Kreindl, Buchkirchen (AT); Andreas Hummelbrunner, Ried im Traunkreis (AT); Harald Grubmair, Ried im Traunkreis (AT); Wolfgang Poellhuber, Lambach (AT)

(73) Assignee: Fronius International GmbH, Pettenbach (AT)

( * ) Notice: Subject to any disclaimer, the term of this patent is extended or adjusted under 35 U.S.C. 154(b) by 439 days.

(21) Appl. No.: 14/256,155

(22) Filed: Apr. 18, 2014

(65) Prior Publication Data

US 2014/0315167 A1 Oct. 23, 2014

(30) Foreign Application Priority Data

Apr. 22, 2013 (AT) .................................. 50273/2013

(51) Int. Cl.
*G09B 19/00* (2006.01)
*G09B 19/24* (2006.01)
(Continued)

(52) U.S. Cl.
CPC ............... *G09B 19/24* (2013.01); *B23K 9/09* (2013.01); *B23K 9/095* (2013.01)

(58) Field of Classification Search
CPC .......... G09B 19/24; G09B 25/00; B23K 9/09; B23K 9/095; B23K 9/0953; B23K 9/0956
(Continued)

(56) References Cited

U.S. PATENT DOCUMENTS

| | | | | |
|---|---|---|---|---|
| 3,867,769 A | * | 2/1975 | Schow | G09B 19/24 219/124.34 |
| 4,132,014 A | * | 1/1979 | Schow | G09B 19/24 434/234 |

(Continued)

FOREIGN PATENT DOCUMENTS

| | | |
|---|---|---|
| CN | 101218060 A | 7/2008 |
| CN | 102083580 A | 6/2011 |

(Continued)

OTHER PUBLICATIONS

Chinese Office Action in CN 201410161777.6, dated Jan. 19, 2016, with English translation.

*Primary Examiner* — Robert J Utama
(74) *Attorney, Agent, or Firm* — Collard & Roe, P.C.

(57) ABSTRACT

The invention relates to a method and a device (1) for simulating an electrode welding process having an electrode holder simulator (2) and a simulated electrode (3) arranged thereon, a simulated workpiece (4), an input device (6), an output device (7) and a control device (10). For the ideal training of an electrode welding process under conditions as real as possible, the control device (10) is connected to a memory (11) for storing parameters ($P_i$) of an ideal motion of the electrode holder simulator (2) during an ignition process and is designed for detecting the parameters ($P_r$) during an actual motion of the electrode holder simulator (2) and comparing them to the stored parameters ($P_i$) of the ideal motion of the electrode holder simulator during an ignition process and displaying the deviations between the parameters ($P_r$) of the actual motion and the parameters ($P_i$) of the ideal motion in the output device (7).

16 Claims, 5 Drawing Sheets (51) Int. Cl.
 *B23K 9/09* (2006.01)
 *B23K 9/095* (2006.01)

(58) Field of Classification Search
 USPC .................................................. 434/219, 234
 See application file for complete search history.

(56) References Cited

U.S. PATENT DOCUMENTS

| | | | | |
|---|---|---|---|---|
| 4,452,589 | A * | 6/1984 | Denison | G09B 19/24 219/136 |
| 4,689,021 | A | 8/1987 | Vasiliev et al. | |
| 4,931,018 | A * | 6/1990 | Herbst | G09B 19/24 345/10 |
| 8,389,897 | B2 | 3/2013 | Sardy et al. | |
| 8,747,116 | B2 | 6/2014 | Zboray et al. | |
| 8,915,740 | B2 | 12/2014 | Zboray et al. | |
| RE45,398 | E * | 3/2015 | Wallace | 219/124.34 |
| 8,992,226 | B1 * | 3/2015 | Leach | G09B 19/24 219/136 |
| 9,101,994 | B2 * | 8/2015 | Albrecht | B23K 9/00 219/121.64 |
| 9,221,117 | B2 * | 12/2015 | Conrardy | B23K 37/04 |
| 2002/0111557 | A1 * | 8/2002 | Madill | A61B 5/0488 600/546 |
| 2008/0314887 | A1 * | 12/2008 | Stoger | B23K 9/0956 219/137 R |
| 2009/0298024 | A1 * | 12/2009 | Batzler | B23K 9/32 434/234 |
| 2010/0062406 | A1 * | 3/2010 | Zboray | G09B 19/24 434/234 |
| 2010/0224610 | A1 * | 9/2010 | Wallace | B23K 9/0953 219/137 R |
| 2011/0006047 | A1 * | 1/2011 | Penrod | B23K 9/0956 219/137 R |
| 2011/0091846 | A1 | 4/2011 | Kreindl et al. | |
| 2012/0122062 | A1 | 5/2012 | Yang et al. | |
| 2012/0189993 | A1 * | 7/2012 | Kindig | G09B 19/24 434/234 |
| 2013/0189657 | A1 * | 7/2013 | Wallace | G09B 5/00 434/234 |
| 2013/0230832 | A1 * | 9/2013 | Peters | G09B 19/24 434/234 |
| 2014/0134580 | A1 * | 5/2014 | Becker | G09B 9/00 434/234 |

FOREIGN PATENT DOCUMENTS

| | | |
|---|---|---|
| CN | 102165504 A | 8/2011 |
| CN | 102165505 A | 8/2011 |
| CN | 102592484 A | 7/2012 |
| WO | 2008/028209 A1 | 3/2008 |
| WO | 2010/000003 A2 | 1/2010 |
| WO | 2010/020870 A2 | 2/2010 |

\* cited by examiner

METHOD AND DEVICE FOR SIMULATING AN ELECTRODE WELDING PROCESS

CROSS REFERENCE TO RELATED APPLICATIONS

Applicant claims priority under 35 U.S.C. §119 of Austrian Application No. A 50273/2013 filed on Apr. 22, 2013, the disclosure of which is incorporated by reference.

The invention relates to a method and a device for simulating an electrode welding process having an electrode holder simulator and a simulated electrode arranged thereon, a simulated workpiece, an input device, an output device and a control device.

There are several systems for simulating welding operations in order to learn welding processes. Therein, the welder to be trained uses a simulated welding torch or welding electrode to perform virtual welding operations, which are evaluated visually by means of a monitor, 3D goggles or a display in a welding helmet and, if applicable, audibly by means of a speaker.

WO 2010/000003 A1, for example, describes a device and a method for the simulation of a welding process using a welding wire, for example a MIG (metal inert gas) or a MAG (metal active gas) welding process.

Learning systems and/or simulation systems are known for electrode welding processes as well. U.S. Pat. Nos. 4,689,021 A and 4,931,018 A, for example, describe practising devices for electrode welding processes, which enable training for handling the electrode during the electrode welding process.

Known methods and devices for simulating electrode welding processes often simulate the welding operation inadequately, so no satisfactory learning effect is obtained. In particular, the learning of the ignition process in electrode welding processes does not receive sufficient attention or is given no attention at all. However, in electrode welding processes, the ignition process poses a great challenge having a strong impact on the welding result.

It is thus the object of the present invention to provide a method as mentioned above and a device as mentioned above for simulating an electrode welding process, which allow providing perfect training including the ignition process, preferably under real conditions. The method is intended to be performable as simple as possible, and the device is intended to be designed as economical and as robust as possible. Drawbacks of known methods and devices for simulating electrode welding processes are to be avoided or at least reduced.

The object according to the invention is achieved by a method as mentioned above, wherein an ignition process is simulated by comparing parameters during an actual motion of the electrode holder simulator to stored parameters of an ideal motion of the electrode holder simulator during an ignition process, and deviations between the parameters of the actual motion and the parameters of the ideal motion are detected and displayed. The method is thus distinguished by saving an ideal ignition process and comparing the actual ignition process to this ideal ignition process and using it to evaluate the quality of the simulated ignition process. The ideal ignition process is distinguished by certain parameters which are saved and stored in the system. The method allows the learning of the ignition process in electrode welding processes under virtual conditions without the need to consume electrodes and workpieces. The ignition process in an electrode welding process is distinguished by a certain path of motion of the electrode over the surface of the workpiece in a sweeping and flowing motion, the lifting of the electrode off the surface of the workpiece and the welding over the ignition point. Depending on how accurately an ideal ignition process is distinguished, more or less parameters are required for setting the ideal motion of the electrode holder simulator during the ignition process. For detecting the parameters of the actual motion of the electrode holder simulator over the simulated workpiece, appropriate sensors corresponding to the parameters used, which are connected to the control device of the simulation device, are required on the electrode holder simulator of the simulated electrode and the simulated workpiece. The simulated workpiece may also be formed by a real workpiece which may be introduced into an associated workpiece holder, for example, provided with a suitable sensor for detecting the location of the electrode holder simulator with respect to the workpiece or the simulated workpiece. The location of the electrode holder simulator with respect to the workpiece, the simulated workpiece and/or a workpiece holder makes it possible to detect the most substantial parameters during the motion of the electrode holder simulator during the ignition process and thus evaluate the simulated ignition process. The display of the deviations between the parameters of the actual motion and the parameters of the ideal motion may be visual, audible or even mechanical, such as by vibration, or by combinations thereof.

The main parameters used for distinguishing the motion during an ignition process include the location of the electrode holder simulator with respect to the simulated workpiece, the speed of the motion of the electrode holder simulator and a sweeping of the area of the simulated workpiece after finishing ignition. These parameters allow distinguishing a simulated ignition process in an electrode welding process very well, so deviations of an actual ignition process from an ideal ignition process may be evaluated very well. The location and the speed of the motion of the electrode holder simulator may be determined by a Polhemus sensor, for example, or other technologies, for example optically.

For learning an ignition process it is advantageous if the ideal motion of the electrode holder simulator is displayed during the ignition process. The ideal motion may be displayed visually as a "ghost" in a monitor or the 3D goggles in the welding helmet. The welder tries to follow the "ghost" as accurately as possible and thus learns the motion of an ideal ignition process in the best possible manner. The "ghost" for visualising the ideal motion during the ignition process may be semi-transparent or blurred, for example, whereas the actual motion of the electrode holder simulator during the ignition process is displayed as an illustration of the electrode holder simulator by continuous lines in a monitor or the like.

Preferably, the start of the display of the ideal motion of the electrode holder simulator during the ignition process is announced, for example with the aid of a visual and/or audible countdown, so the welder can prepare accordingly for the upcoming task.

In case the residence time and, if applicable, the force of a touch of the simulated electrode on the simulated workpiece are measured, the simulation may be evaluated even better. The residence time of the simulated electrode on the simulated workpiece may be measured in a simple manner by detecting a short circuit between the simulated electrode and the simulated workpiece, for example. Alternatively, this may also be done by a mechanical sensing device at the tip of the simulated electrode. For quantitatively detecting the contact force of the simulated electrode on the surface of the workpiece and/or the simulated workpiece, various mechanical or electromechanical sensors as well as optical systems arranged at the tip of the simulated electrode may be used. When practising the ignition process in a virtual space, the residence time and the virtual contact force of the simulated electrode on a non-real workpiece may be detected via the location as well.

In order to adapt the simulation process to real conditions even better, a sticking of the simulated electrode to the simulated workpiece may be simulated, for example by activating an electromagnet via the control device, if the measured residence time and, if applicable, the measured force deviate from given threshold values. When simulating the ignition process using a simulated electrode on a simulated workpiece, sticking will be simulated if threshold values for the residence time and, if applicable, the contact force are exceeded. If the welder has the simulated electrode reside on the simulated workpiece for too long and/or if the simulated electrode is pressed onto the simulated workpiece too strong, the electromagnet may be activated to simulate sticking. The sticking may be released by overcoming the force of the electromagnet, or the control device releases the stuck simulated electrode and automatically deactivates the electromagnet after a given time. When moving the simulated electrode in virtual space, the residence time and, if applicable, the force falling below a threshold value may be crucial as well. As far as activating and deactivating an anti-stick feature is possible with the simulation device, this may have an impact on the simulation of the sticking.

Advantageously, the ignition processes are repeated until the deviations of a given number of actual motions of the electrode holder simulator from the ideal motion of the electrode holder simulator during an ignition process are within a given range of tolerance. In this way, the welder to be trained may be instructed to repeat the practising of ignition processes until his abilities exceed a preset value. Other simulation procedures may not be started before this is achieved, for example.

When the stored parameters of an ideal motion of the electrode holder simulator are modified by modifying influencing parameters in the input device, various scenarios that occur with ignition processes of electrode welding processes in reality may be practised in an ideal manner. Examples for such influencing parameters may include the activating of an anti-stick feature, the activating of a hot start, the activating of a reduction of the welding voltage, the type and length of the simulated electrode, etc. When an anti-stick feature is activated on the simulation device, for example, a simulated electrode sticking to the simulated workpiece will be released earlier when compared to this anti-stick feature not being activated. When activating a hot start, pre-heating the electrode may be simulated. When activating a reduction of the welding voltage, a welding process in mines, where a voltage reduction may be mandatory (VRD voltage reduction device), may be simulated, and ignitions may be practised in this changed situation. The type, the length, the jacket of the simulated electrode and the like may influence and modify the stored parameters for the ideal motion during the ignition process and allow the simulation process under changed conditions. In practice, a plurality of stored parameters for distinguishing various ignition processes will be saved, and the respective influencing parameters will be used to select those parameters that form the basis for the comparison of the actual motion to the ideal motion during the ignition process.

If an audible signal of an ignition process is played during the actual motion of the electrode holder simulator during an ignition process, the simulation process may be adapted to real conditions even better. The audible signal may be a sound recording of a real ignition process or a synthetically generated signal which is similar to an ignition process.

Preferably, the location of the electrode holder simulator with respect to the simulated workpiece is calibrated before simulating the ignition process. Unless the sensors for measuring the location of the electrode holder simulator with respect to the simulated workpiece are able to detect the absolute location, such a calibration may be required, which may be performed by executing a given motion of the electrode holder simulator, for example.

The object according to the invention is also achieved by a device as mentioned above for simulating an electrode welding process, wherein the control device is connected to a memory for storing parameters of an ideal motion of the electrode holder simulator during an ignition process and which is designed for detecting the parameters during an actual motion of the electrode holder simulator and comparing them to the stored parameters of the ideal motion of the electrode holder simulator during an ignition process and displaying the deviations between the parameters of the actual motion and the parameters of the ideal motion in the output device. Such a device may be created relatively simple and economically. For the advantages to be obtained thereby, reference is made to the above discussion of the method for simulating the electrode welding process.

The memory is preferably designed for storing as parameters the location of the electrode holder simulator with respect to the simulated workpiece, the speed of the motion of the electrode holder simulator and the sweeping of the area of the simulated workpiece after an ignition has been performed.

The output device is preferably designed for displaying the ideal motion of the electrode holder simulator during the ignition process. The output device may be formed by a monitor, 3D goggles, a display in a welding helmet or by an interface for exporting the data, for example to an external network.

The output device is preferably designed for announcing the start of the display of the ideal motion of the electrode holder simulator during the ignition process, which may be performed by a visual and/or audible countdown, for example.

If a force sensor for detecting the force of a touch of the simulated electrode on the simulated workpiece is provided, which force sensor is connected to the control device, the ignition process performed may be evaluated even better.

A sticking of the simulated electrode to the simulated workpiece may be simulated by means of an electromagnet if the residence time of the simulated electrode on the simulated workpiece or the contact force of the simulated electrode deviates from certain threshold values. For the purpose of an appropriate control, the electromagnet is connected to the control device.

If the input device is designed for the input of influencing parameters such as the activating of an anti-stick feature, the activating of a hot start, the activating of a reduction of the welding voltage, the type and length of the simulated electrode etc. and the input device is connected to the control device, the stored parameters of the ideal motion of the electrode holder simulator may be modified by the influencing parameters, and various types of ignition processes may be practised. The input device may be formed by a type of power source of a real welding device or by corresponding control elements on the simulation device.

If a speaker for the audible playback of a signal of an ignition process during the actual motion of the electrode holder simulator during an ignition process is provided, the virtual ignition process may be adapted to real conditions even better.

Preferably, at least one sensor for measuring the location of the electrode holder simulator with respect to the simulated workpiece or a workpiece holder for receiving the simulated workpiece is provided, which at least one sensor is connected to the control device. Depending on the type, number and arrangement of such sensors, a calibration of the location of the electrode holder simulator with respect to the simulated workpiece may be required or not. As has already been mentioned above, the location may be detected by means of a Polhemus sensor, for example.

In case of a required calibration, the control device is designed for calibrating the location of the electrode holder simulator with respect to the simulated workpiece before simulating the ignition process.

The present invention will be discussed in more detail by means of the attached drawings, which show exemplary embodiments of the invention. In the drawings

Figure 1:
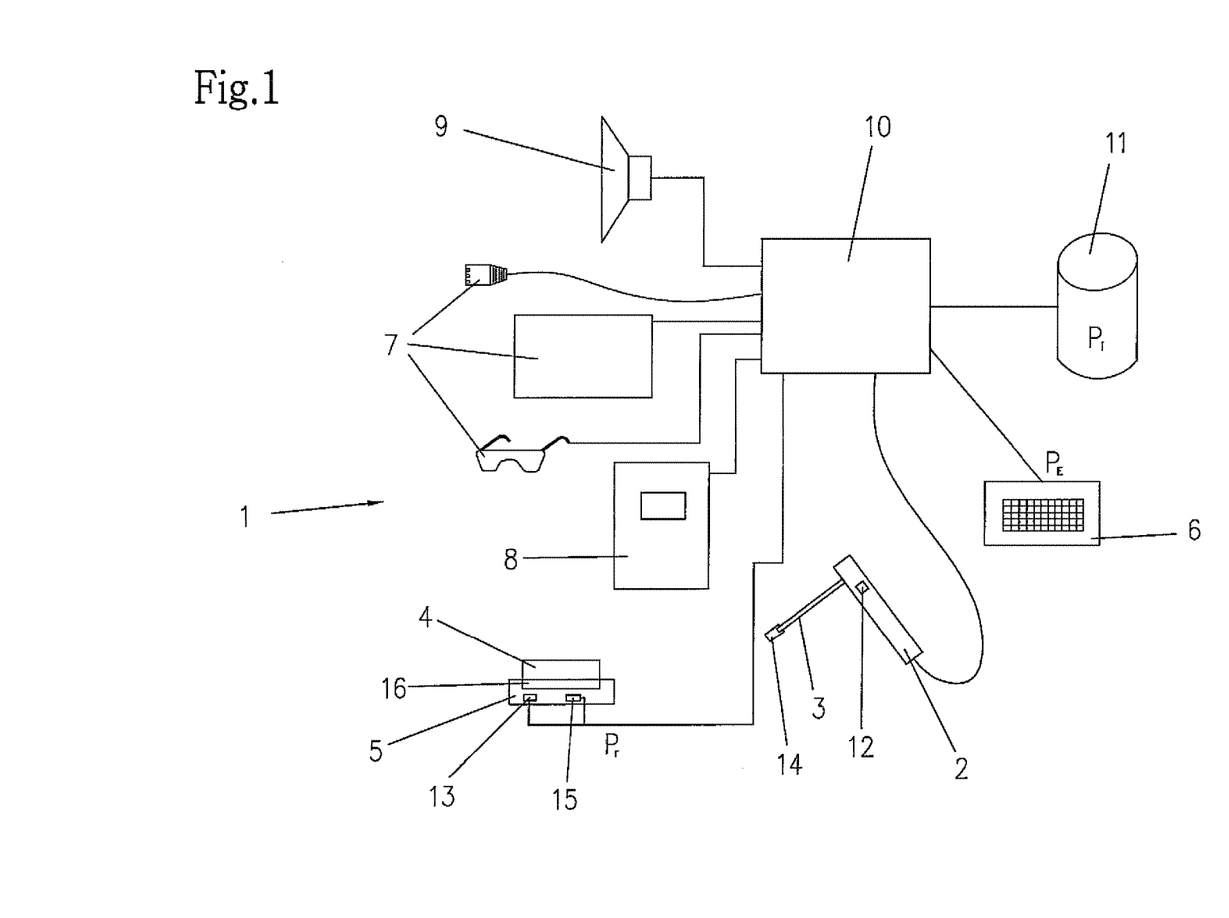
FIG. 1 shows a block diagram of a device for simulating an electrode welding process.

FIG. 1 shows a block diagram of a device 1 for simulating an electrode welding process. The device 1 includes an electrode holder simulator 2 and a simulated electrode 3 arranged thereon, a simulated workpiece 4, which may also be formed by a real workpiece arranged in an associated workpiece holder 5. The welder to be trained may operate the simulation device 1 by means of an input device 6. By means of an output device 7, which may be formed by a monitor, 3D goggles, an interface (for example to an external network) but also by a welding helmet 8 having an integrated display, feedback about the simulated ignition processes is provided to the welder. A control device 10 processes the respective signals and executes the corresponding simulation processes. For the audible playback of signals or the reproduction of real sounds during the welding process a speaker 9 may be provided. The control device 10 is connected to a memory 11 for storing parameters $P_i$ of an ideal motion of the electrode holder simulator 2 during an ignition process and designed for detecting the parameters $P_r$ during an actual motion of the electrode holder simulator 2 and comparing them to the stored parameters $P_i$ of the ideal motion of the electrode holder simulator 2 during an ignition process and displaying the deviations between the parameters $P_r$ of the actual motion and the parameters $P_i$ of the ideal motion. That is, a series of parameters $P_i$, which distinguish an ideal motion of the electrode holder simulator 2 during an ignition process in an electrode welding process, are saved in the memory 11. In practice, the control device 10, the memory 11, the input device 6, the output device 7 and the speaker 9 are formed by a computer to which the further components are connected via suitable interfaces (not illustrated).

For detecting the parameters $P_r$ during the actual motion of the electrode holder simulator 2, appropriate sensors are arranged on the simulated workpiece 4 or the workpiece holder 5 and/or the electrode holder simulator 2. For example, a location sensor 12 may be arranged in the electrode holder simulator 2 and a location sensor 13 may be arranged in the simulated workpiece 4 or in the workpiece holder 5, which detect the location of the electrode holder simulator 2 with respect to the simulated workpiece 4. The contact force of the simulated electrode 3 on the simulated workpiece 4 may be detected and incorporated into the simulation via a force sensor 14 at the tip of the simulated electrode 3. For example, an electromagnet 15 in the workpiece holder 5 may be activated when a given contact force is exceeded in order to simulate a sticking of the simulated electrode 3 to the simulated workpiece 4. Instead of an electronic implementation of the sticking, a hook-and-loop fastener 16 or the like may also be arranged on the simulated workpiece 4, and the tip of the simulated electrode 3 may be designed accordingly (not illustrated), so a sticking of the simulated electrode 3 to the simulated workpiece 4 may be simulated in this way when exceeding a certain contact force. In case of a sticking of the simulated electrode 3, the sticking may be visualised in the output device 7, for example by the simulated electrode 3 glowing as it would occur in reality.

Figure 2:
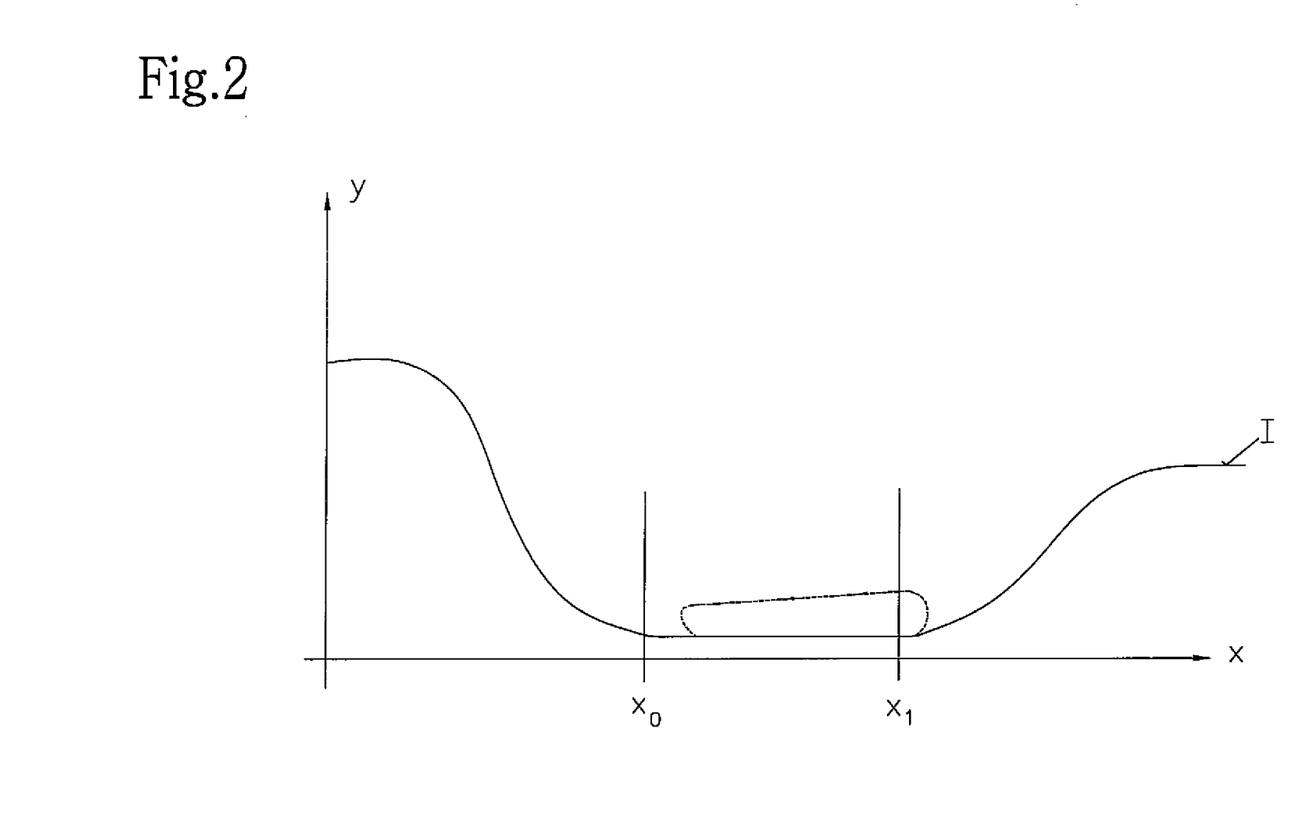
FIG. 2 shows the ideal motion of an electrode during an ideal ignition process in an electrode welding process in schematic manner.

In FIG. 2 the ideal motion of an electrode during an ideal ignition process in an electrode welding process is shown in schematic manner. Herein, the path I is depicted by the distance y from the surface of the workpiece over the distance x. After the electrode approaches the workpiece, the electrode is directed towards the surface of the workpiece in an acute angle to the normal. In this location, the electrode is approached to a certain distance above the surface of the workpiece, wherein the speed should be in the tolerance range of a given value. Next, a slow driving towards the surface of the workpiece with reduced speed and finally a touching of the workpiece by the electrode follows, wherein a certain residence time should be maintained. From the starting point $x_0$ on, the electrode on the surface of the workpiece is swept on a given length to point $x_1$ with a given speed and then, beyond point $x_1$, lifted off the surface of the workpiece to a certain height with a certain speed. After lifting the electrode off the surface of the workpiece and forming the electric arc, the ignition area is swept, i. e. a loop back to the starting point $x_0$ of the ignition is completed with a speed typical for the sweeping. Next, one more sweeping of the electrode over the surface of the workpiece follows, for a given length and with a given speed. By lifting the electrode off the surface of the workpiece to a certain height, the ignition process is finished and continues with a normal welding process.

Figure 3:
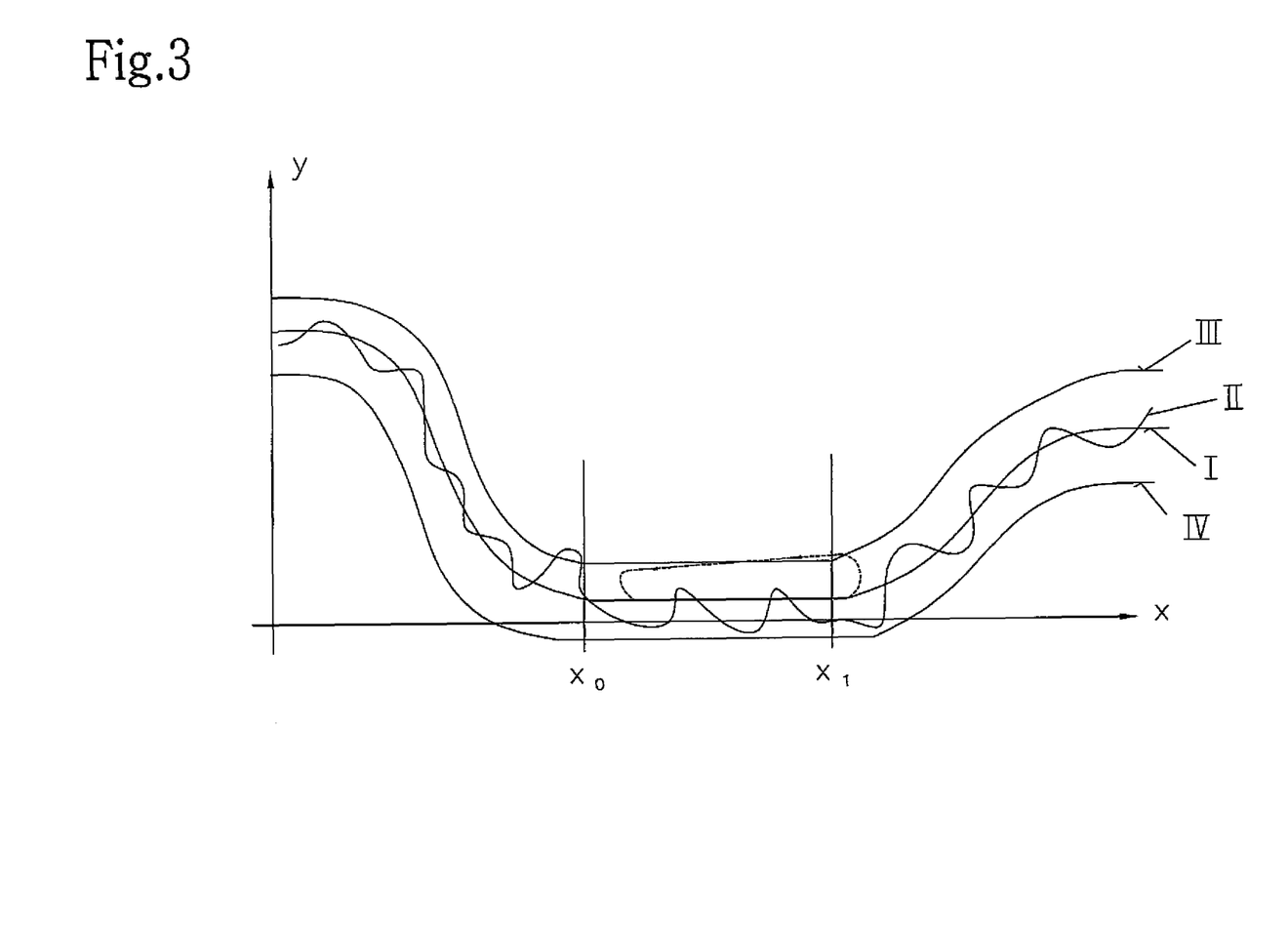
FIG. 3 shows the actual motion of an electrode during an ignition process in an electrode welding process and the comparison to a stored ideal motion in schematic manner.

FIG. 3 shows the actual motion of an electrode during an ignition process in an electrode welding process and the comparison to a stored ideal motion of the simulation method according to the invention in schematic manner. Here, the ideal ignition process I illustrated in FIG. 2 is contrasted with an actual ignition process II, which are compared and evaluated during the simulation of the ignition process. Above and below the ideal ignition process I, tolerance ranges and/or thresholds III, IV may be defined, which should not be exceeded in the actual ignition process II. A different welding task may not be started until a given number of simulated ignition processes has been completed successfully, for example seven out of ten processes.

Figure 4:
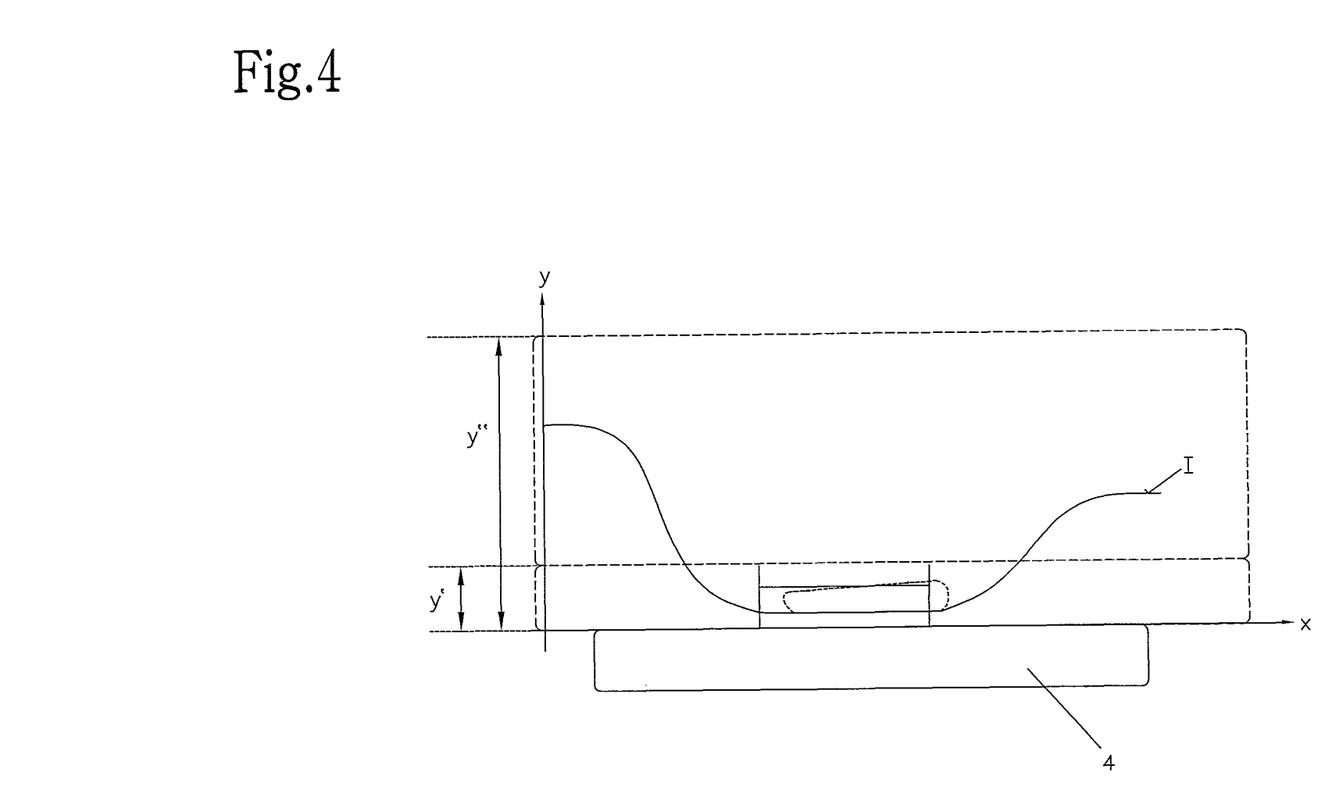
FIG. 4 shows a scheme for the referencing phase for the automatic playback of an ideal ignition process.

FIG. 4 shows a scheme for the referencing phase for the automatic playback of an ideal ignition process, wherein a referencing phase for the start of the ideal ignition process is activated in a certain distance y" from the workpiece 4. Once the simulated electrode 3 reaches a certain distance y' from the surface of the workpiece 4 and/or the simulated workpiece, the starting phase for the ideal motion of the electrode holder simulator 2 during an ignition process and, for example after a countdown, the start of this "ghost" are started automatically. Now, the welder has to use the electrode holder simulator 2 to follow the ideal motion of the "ghost" without exceeding the tolerance thresholds III, IV described in FIG. 3.

Figure 5:
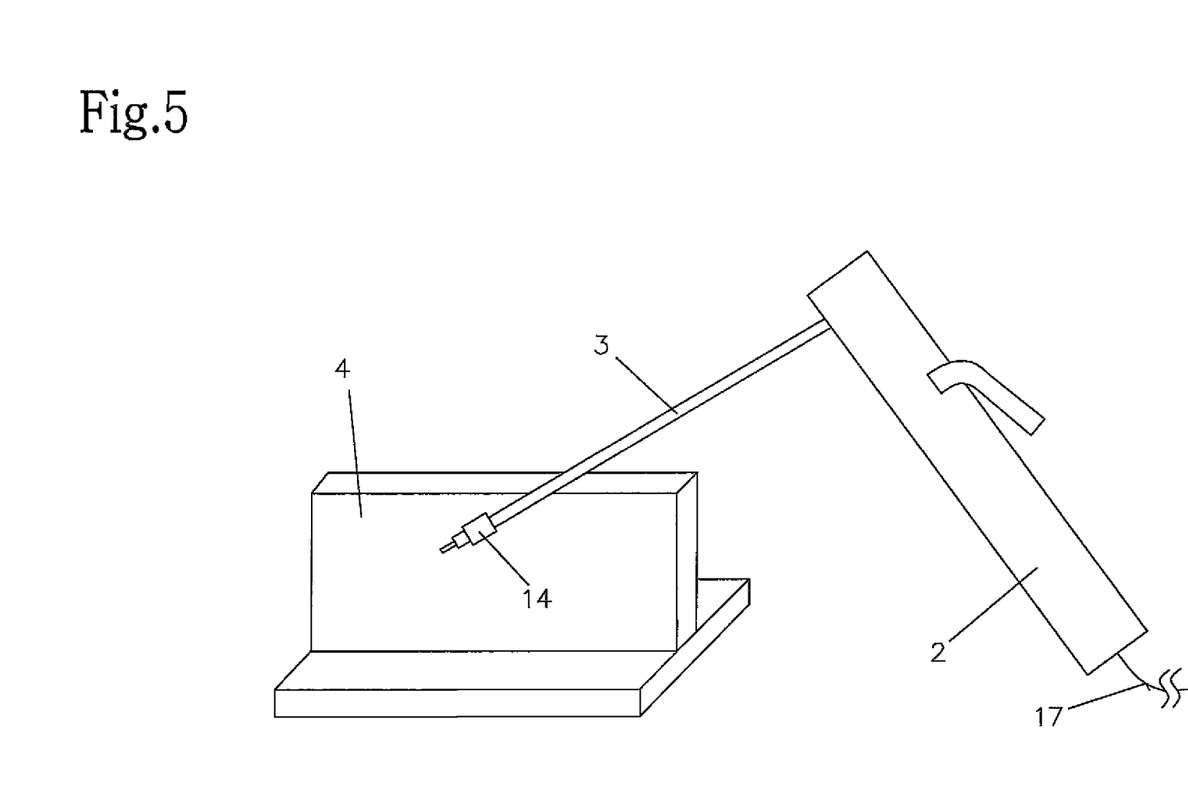
FIG. 5 shows an embodiment of an electrode holder simulator and a simulated electrode arranged thereon and a simulated workpiece.

Finally, FIG. 5 shows an embodiment of an electrode holder simulator 2 and a simulated electrode arranged thereon 3 and a simulated workpiece 4. The electrode holder simulator 2 is connected to the control device 10 (see FIG. 1) by means of a respective line 17. A force sensor 14 for measuring the contact force of the simulated electrode 3 on the simulated workpiece 4 may be arranged at the tip of the simulated electrode 3. In addition, the simulated electrode 3 may be arranged with a modifiable length in order to be able to simulate a burn-off of the simulated electrode 3 by reducing the length of the simulated electrode 3. This may be implemented by reducing the distance of the free end of the simulated electrode 3 from the electrode holder simulator 2, for example.

The invention claimed is:

1. A method for simulating an ignition process of an electrode welding process, the method comprising steps of:
providing a device comprising: an electrode holder simulator, a simulated electrode arranged thereon, a simulated workpiece, an input device, an output device and a control device,
simulating an ignition process by comparing first parameters during an actual motion of the electrode holder simulator to second stored parameters of an ideal motion of the electrode holder simulator during an ignition process,
detecting deviations between the first parameters of the actual motion and the second stored parameters of the ideal motion, and
displaying the deviations,
wherein the second stored parameters comprise a location of the electrode holder simulator with respect to the simulated workpiece, the speed of the motion of the electrode holder simulator, and a sweeping of the area of the simulated workpiece after finishing ignition, and
wherein a residence time is measured and a sticking of the simulated electrode to the simulated workpiece is simulated if the measured residence time deviates from a given threshold value.

2. The method of claim 1, wherein the ideal motion of the electrode holder simulator is displayed during the ignition process.

3. The method of claim 2, wherein the start of the display of the ideal motion of the electrode holder simulator during the ignition process is announced.

4. The method of claim 1, wherein the ignition processes are repeated until the deviations of a given number of actual motions of the electrode holder simulator from the ideal motion of the electrode holder simulator during an ignition process are within a given range of tolerance.

5. The method of claim 1, wherein the second stored parameters of an ideal motion of the electrode holder simulator are modified in the input device by modifying third influencing parameters selected from the group consisting of: the activating of an anti-stick feature, the activating of a hot start, the activating of a reduction of the welding voltage, the type and length of the simulated electrode.

6. The method of claim 1, wherein an audible signal of an ignition process is played during the actual motion of the electrode holder simulator during an ignition process.

7. The method of claim 1, wherein the location of the electrode holder simulator with respect to the simulated workpiece is calibrated before simulating the ignition process.

8. A device for simulating an ignition process of an electrode welding process, the device comprising:
an electrode holder simulator and a simulated electrode arranged thereon,
a simulated workpiece,
an input device,
an output device,
a control device, and
a memory connected to the control device,
wherein the control device is designed to send parameters of an ideal motion of the electrode holder simulator during an ignition process to the memory for storage of the parameters in the memory and is designed for detecting the parameters during an actual motion of the electrode holder simulator and comparing them to the stored parameters of the ideal motion of the electrode holder simulator during an ignition process and displaying the deviations between the parameters of the actual motion and the parameters of the ideal motion in the output device,
wherein the parameters comprise the location of the electrode holder simulator with respect to the simulated workpiece, the speed of the motion of the electrode holder simulator, and the sweeping of the area of the simulated workpiece after finishing ignition, and
wherein the device is configured to measure the residence time and to simulate a sticking of the simulated electrode to the simulated workpiece if the measured residence time deviates from a given threshold value.

9. The device of claim 8, wherein the output device is designed for displaying the ideal motion of the electrode holder simulator during the ignition process.

10. The device of claim 9, wherein the output device is designed for announcing the start of the display of the ideal motion of the electrode holder simulator during the ignition process.

11. The device of claim 8, wherein a force sensor for detecting the force of a touch of the simulated electrode on the simulated workpiece is provided, which force sensor is connected to the control device.

12. The device of claim 11, wherein an electromagnet for simulating the sticking of the simulated electrode to the simulated workpiece is provided, which electromagnet is connected to the control device.

13. The device of claim 8, wherein the input device is designed for inputting influencing parameters selected from the group consisting of the activating of an anti-stick feature, the activating of a hot start, the activating of a reduction of the welding voltage, and the type and length of the simulated electrode and
wherein the input device is connected to the control device, so the stored parameters of the ideal motion of the electrode holder simulator are modifiable by the influencing parameters.

14. The device of claim 8, wherein a speaker for the audible playing of a signal of an ignition process during the actual motion of the electrode holder simulator during an ignition process is provided.

15. The device of claim 8, wherein at least one sensor for measuring the location of the electrode holder simulator with respect to the simulated workpiece or a workpiece holder for receiving the simulated workpiece is provided, which at least one sensor is connected to the control device.

16. The device of claim 8, wherein the control device is designed for calibrating the location of the electrode holder simulator with respect to the simulated workpiece before simulating the ignition process.

\* \* \* \* \*